US011586707B2

(12) United States Patent
Nicholson et al.

(10) Patent No.: US 11,586,707 B2
(45) Date of Patent: Feb. 21, 2023

(54) SMART INCLUSION OF TECHNOLOGY AT TIME OF USE

(71) Applicant: LENOVO (Singapore) PTE. LTD., New Tech Park (SG)

(72) Inventors: John Weldon Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 35 days.

(21) Appl. No.: 17/219,621

(22) Filed: Mar. 31, 2021

(65) Prior Publication Data

US 2022/0318343 A1 Oct. 6, 2022

(51) Int. Cl.
*G06Q 20/00* (2012.01)
*G06F 21/10* (2013.01)
*G06F 21/73* (2013.01)
*G06Q 20/42* (2012.01)
*G06Q 20/38* (2012.01)
*G06F 21/60* (2013.01)

(52) U.S. Cl.
CPC .......... *G06F 21/105* (2013.01); *G06F 21/602* (2013.01); *G06F 21/73* (2013.01); *G06Q 20/382* (2013.01); *G06Q 20/425* (2013.01); *G06F 2221/0751* (2013.01)

(58) Field of Classification Search
CPC ...... G06F 21/105; G06F 21/602; G06F 21/73; G06F 2221/0751; G06Q 20/382; G06Q 20/425
USPC .......................... 705/16, 21, 59; 380/44, 262
See application file for complete search history.

(56) References Cited

U.S. PATENT DOCUMENTS

| 2005/0039061 A1* | 2/2005 | Schultz | G06F 21/10 713/310 |
| 2019/0342404 A1* | 11/2019 | Kundu | H04W 28/0226 |
| 2020/0053433 A1* | 2/2020 | Beals | H04N 21/8453 |

* cited by examiner

*Primary Examiner* — Dante Ravetti
(74) *Attorney, Agent, or Firm* — Kunzler Bean & Adamson

(57) ABSTRACT

Apparatuses, methods, systems, and program products are disclosed for modifying the enabled features of a hardware component at the time of use. An apparatus includes a processor and memory that stores code executable by the processor. The code is executable by the processor to obtain a feature of the hardware component that is not enabled and generates an encrypted code associated with the feature of the hardware component to be enabled. The apparatus processes a payment for the cost of enabling the hardware component and enables the feature of the hardware component in response to the association of the payment processed with the encrypted code for the feature of the hardware component.

20 Claims, 6 Drawing Sheets

SMART INCLUSION OF TECHNOLOGY AT TIME OF USE

FIELD

The subject matter disclosed herein relates to computing devices and more particularly relates to selective resource management of features on a hardware component at the time of use.

BACKGROUND

Computing devices have various resources on a hardware component that can be enabled through firmware and system software on the device. The hardware component is designed to execute programs, run system software, process data, or the like. The computing device model's base configuration is generally characterized by the enabled and disabled features on the hardware components.

BRIEF SUMMARY

Apparatuses, methods, systems, and program products are disclosed for modifying the enabled features of a hardware component at the time of use. An apparatus including a processor and a memory storage device that stores code executable by the processor is disclosed in one embodiment. The processor obtains a feature of a hardware component that is not enabled and generates an encrypted code associated with the element to be enabled on the hardware component. Upon receipt of the payment, the processor enables the feature of the hardware component in response to the association of the payment processed with the encrypted code for the feature of the hardware component.

In one embodiment, a method for selective enablement of a feature is disclosed. The method includes obtaining a feature of a hardware component that is not enabled and generating an encrypted code associated with the feature to be enabled. The method further includes processing a payment for a cost for enabling the hardware component associated with the feature and enabling the feature of the hardware component in response to the association of the payment processed with the encrypted code for the feature of the hardware component.

In one embodiment, a computer program product is disclosed. The computer program product includes a computer-readable storage medium having program instructions embodied therewith. The program instructions are executable by a processor to cause the processor to obtain a feature of a hardware component that is not enabled and generates an encrypted code associated with the feature of the hardware component to be enabled. The program processes a payment for the cost of enabling the hardware component and enables the feature of the hardware component in response to the association of the payment processed with the encrypted code for the feature of the hardware component.

BRIEF DESCRIPTION OF THE DRAWINGS

A more particular description of the embodiments briefly described above will be rendered by reference to specific embodiments illustrated in the appended drawings. Understanding that these drawings depict only some embodiments and are not, therefore, to be considered to be limiting of scope, the embodiments are described and explained below with additional specificity and detail through the use of the accompanying drawings, in which.

DETAILED DESCRIPTION

Figure 1:
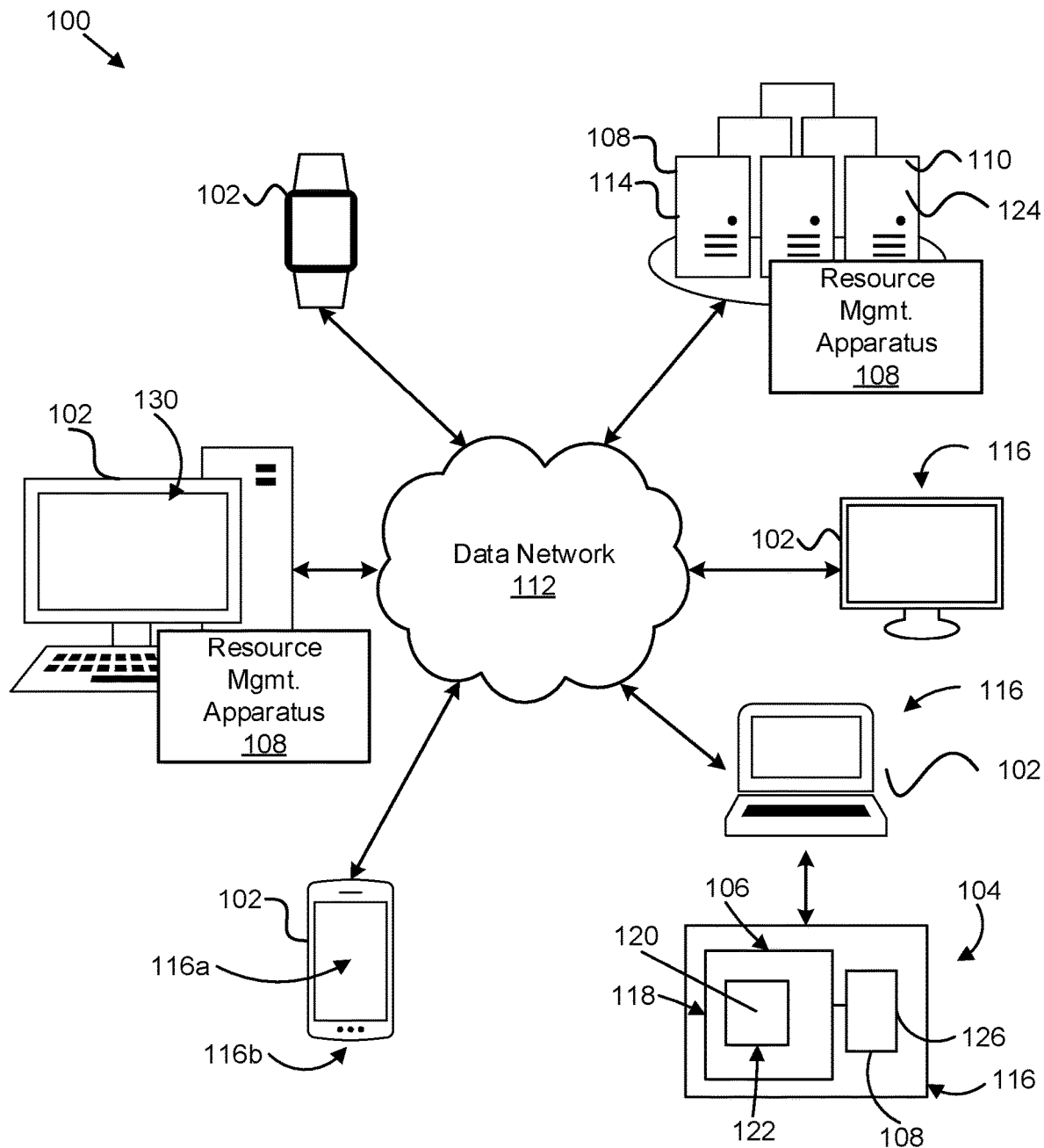
FIG. 1 is a schematic block diagram illustrating one embodiment of a system for a hardware component and technology feature management during the use of the computing device.

As appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, embodiments may take the form of a program product embodied in one or more computer-readable storage devices storing machine-readable code, computer-readable code, and/or program code, referred hereafter as code. The storage devices may be tangible, non-transitory, and/or non-transmission. The storage devices may not embody signals. In a specific embodiment, the storage devices only employ signals for accessing code.

Many of the functional units described in this specification have been labeled as modules to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware components such as field-programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together but may comprise disparate instructions stored in different locations that, when joined together logically, comprise the module and achieve the module's stated purpose.

A code module may be a single instruction or many instructions and may even be distributed over several different code segments, among various programs, and across several memory devices. Similarly, operational data may be identified and illustrated herein within modules and may be embodied in any suitable form and organized within any appropriate data structure type. The operational data may be collected as a single data set or distributed over different locations, including other computer-readable storage devices. Where a module or portions of a module are implemented in software, the software portions are stored on one or more computer-readable storage devices.

Any combination of one or more computer-readable mediums may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific embodiments (a non-exhaustive list) of the storage device would include the following: an electrical connection having one or more wires, a portable computer diskette, a hard disk, a random-access memory (RAM), a read-only memory (ROM), an (electronically) erasable programmable read-only memory (EPROM, EEPROM, and/or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for various embodiments may be written in any combination of one or more programming languages, including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer, or entirely on the remote computer or server. In the latter scenario, the remote computer may connect to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all the items are mutually exclusive unless expressly specified otherwise. The terms "a," "an," and "the" also refer to "one or more" unless expressly specified otherwise.

Furthermore, the described features, structures, or characteristics of the embodiments may combine in any suitable manner. In the following description, numerous specific details are provided, such as embodiments of programming, software modules, user selections, network transactions, database queries, database structures, hardware modules, hardware circuits, hardware chips, etc., to provide a thorough understanding of embodiments. However, one skilled in the relevant art would recognize that embodiments may be practiced without one or more of the specific details or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. Each block of the schematic flowchart diagrams and/or schematic block diagrams, and combinations of blocks in the schematic flowchart diagrams and/or schematic block diagrams, can be implemented by code. This code may be provided to a processor of a general-purpose computer, a cellphone, a special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, another programmable machine, or other devices to produce a computer-implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may indicate only the logical flow of the depicted embodiment. For instance, an arrow may indicate a waiting or monitoring period of unspecified duration between the illustrated embodiment's enumerated steps. Each block of the block diagrams and/or flowchart diagrams, and combinations of blocks in the block diagrams and/or flowchart diagrams, can be implemented by particular/special purpose hardware-based systems that perform the specified functions or acts or combinations of special purpose hardware and code.

The description of elements in each figure may refer to elements of proceeding figures. Like numbers refer to like elements in all figures, including alternate embodiments of like elements.

An apparatus in one embodiment includes a processor and a memory storage device that stores code executable by the processor. In various embodiments, the apparatus obtains a feature of a hardware component that is not enabled, generates an encrypted code associated with the feature of the hardware component to be enabled, processes a payment for a cost of enabling the hardware component, and enables the feature of the hardware component in response to the association of the payment processed with the encrypted code for the feature of the hardware component.

In one embodiment, the code executable on the memory storage device displays the feature's cost and requests a user confirmation before processing the payment. In one embodiment, a secure database includes a public key. The secure database can obtain the public key prior to generating the encrypted code as a private key and recording the payment for the feature enabled on the hardware component in the encrypted code associated with the private key.

In one embodiment, the cost includes a licensing fee for a technology-enabled on the hardware component.

In one embodiment, the code executable on the memory storage device determines the apparatus's location and determines whether to enable the feature and the cost for enabling the feature based on the site determined for the instrument.

In various embodiments, the code executable on the memory storage device further recommends a second feature to be modified on a related hardware component that interacts with the enabled feature. In one embodiment, the code executable on the memory storage device further enables a second feature on a second hardware component to enable the feature in response to the encrypted code for the hardware component. The code executable on the memory storage device further disables a second feature on the second hardware component.

In various embodiments, the code executable on the memory storage device further generates a recurring cost for the feature enabled on the hardware component. For example, the code executable on the memory storage device can also monitor the use of the feature enabled on the hardware component and generate the recurring cost based on the feature's use.

A method for modifying the enabled features of a hardware component at the time of use, in one embodiment, includes obtaining a feature of a hardware component that is not enabled, generating an encrypted code associated with the feature of the hardware component to be enabled, processing a payment for a cost for enabling the hardware component associated with the feature, and enabling the feature of the hardware component in response to the association of the payment processed with the encrypted code for the feature of the hardware component.

In one embodiment, the method includes displaying the cost for the feature and requesting a user confirmation prior to processing the payment for enabling the hardware component. In one embodiment, a secure database has a public key, and the method further includes obtaining the public key prior to generating the encrypted code as a private key and recording the payment for the feature enabled on the hardware component in the encrypted code associated with the private key.

In one embodiment, the cost of enabling the hardware component associated with the feature includes a licensing fee for a technology-enabled hardware component.

In one embodiment, the method further includes determining the device's location and determining whether to enable the feature and the cost associated with enabling the feature of the hardware component based on the location determined.

In various embodiments, the method further includes recommending a second feature to be modified on a related hardware component that interacts with the enabled feature. For example, in one embodiment, the method further includes enabling a second feature on a second hardware component to enable the requested feature to respond to the hardware component's encrypted code. The method includes disabling a second feature on a second hardware component in another embodiment.

In one embodiment, the method includes monitoring the use of the enabled feature on the hardware component and generating a recurring cost for the enabled feature on the hardware component based on the use of the feature.

A computer program product, in one embodiment, includes a computer-readable storage medium having program instructions embodied therewith. The program instructions are executable by a processor to cause the processor to obtain a feature of a hardware component that is not enabled, generate an encrypted code associated with the feature of the hardware component to be enabled, process a payment for a cost of enabling the hardware component, and enable the feature of the hardware component in response to the association of the payment processed with the encrypted code for the feature of the hardware component.

FIG. 1 is a schematic block diagram illustrating one embodiment of a system 100 for selective feature management on a device's hardware component during use. In one embodiment, the system 100 includes one or more information handling devices or computing devices 102 having one or more circuit boards 104 with various hardware components 106, one or more resource management apparatuses 108 on the circuit board 104 and/or located on a separate the master management device 110, one or more data networks 112, and one or more servers 114.

Although FIG. 1 shows a specific number of computing devices 102, circuit boards 104, hardware components 106, resource management apparatuses 108, data networks 112, and servers 114 are depicted in FIG. 1, one of skill in the art would recognize that system 100 may include any number of computing devices 102, circuit boards 104, hardware components 106, resource management apparatuses 108, master management devices 110, data networks 112, and/or servers 114 may be included in system 100.

In one embodiment, the resource management apparatus 108 is located on the circuit board 104 and communicates with a master management device 110 on the server 114. In another embodiment, the resource management apparatus 108 is located on the server 114 and controls the computing device 102. The resource management apparatus 108 may be located on both the computing device 102 and one or more servers 114. As used herein, a resource management apparatus 108 can include a master management device 110 located on a separate device (e.g., the server 114) and/or a resource management apparatus 108 located directly on the circuit board 104 or another location on the computing device 102.

In one embodiment, the system 100 includes one or more computing devices 102, each having one or more circuit boards 104 with various features 116 encoded within the firmware 118 to activate and control various hardware components 106. Data regions 120 of firmware 118 may provide a mechanism for controlling all or a part of the functionality, technology, and/or features 116 enabled/disabled on the hardware component 106. In general, enabling a feature 116 makes the technology available to the computing device 102 and/or the circuit board 104. Similarly, disabling a feature 116 removes the associated technology for the access of the computing device 102 and/or the circuit board 104.

The computing devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, an IoT vehicle (e.g., car, boat, airplane, etc.) or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

Figure 2:
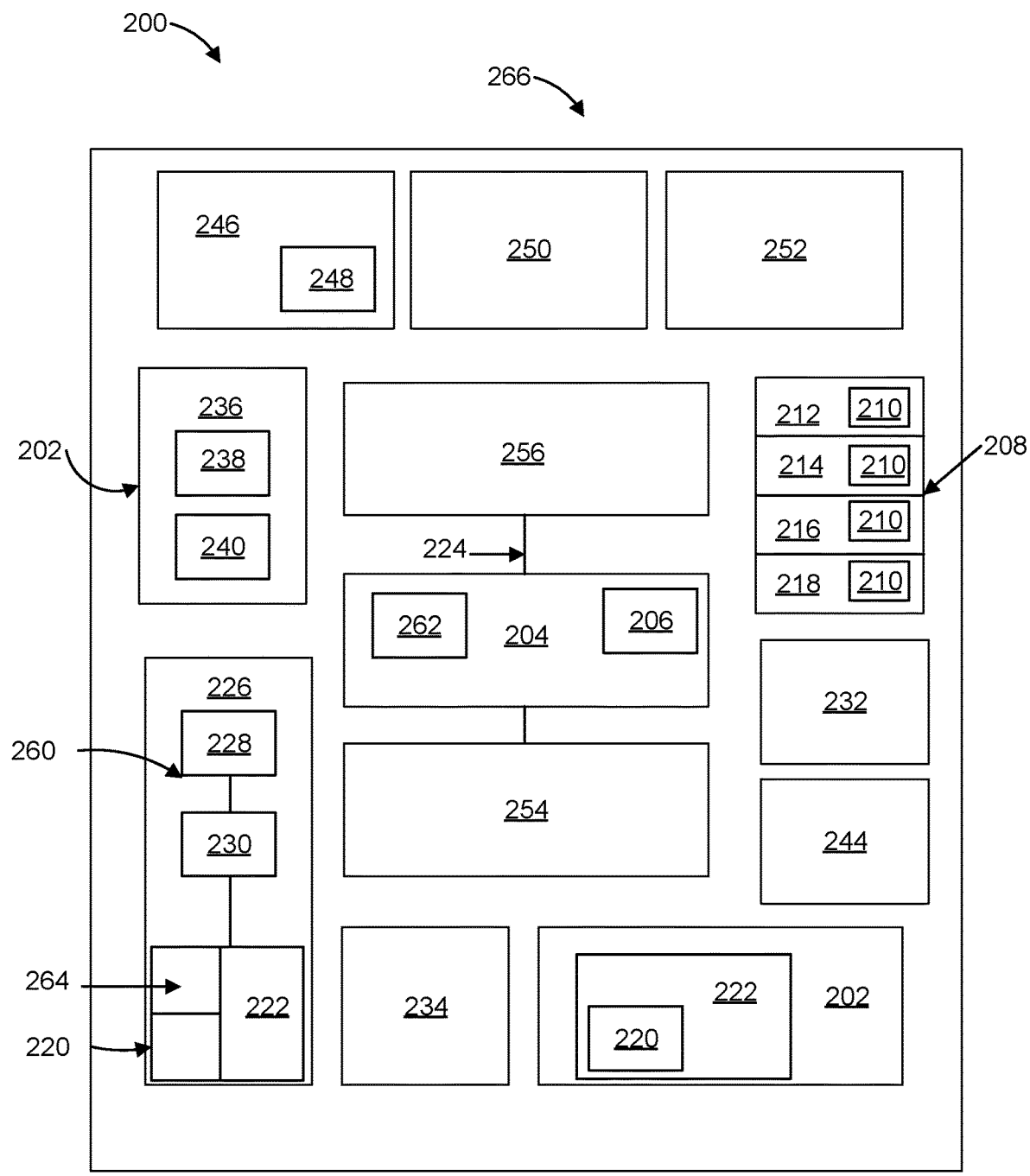
FIG. 2 is a schematic block diagram illustrating one embodiment of a hardware component with technology feature management during the use of the hardware component.

FIGS. 1 and 2 illustrate the connection of the resource management apparatus 108 with the computing device 102 to enable and/or disable features 116 from the circuit board 104 during the use of the computing device 102. The resource management apparatus 108 is generally configured to determine various enabled/disabled technologies and/or features 116 to be enabled/disabled on a hardware component 106 of the computing device 102. A feature 116 is a technology of the hardware component 106 that can be enabled or disabled on the computing device 102. For example, a video codec and an audio codec are separate features 116.

The resource management apparatus 108 obtains various features 116 of the hardware components 106 to be removed and operates a virtual fuse 122 to selectively remove one or more data regions 120 associated with the feature 116. After the data region 120 is disabled, the feature 116 is no longer available to the processor and/or the circuit board 104. Similarly, to enable a technology or the feature 116, the resource management apparatus 108 operates virtual fuse 122 to selectively enable, program, or add to one or more data regions 120 associated with the feature 116. In response to the virtual fuse 122 enabling or disabling a feature 116, the resource management apparatus 108 may update a server 114 and/or indicate the status of the feature 116 of the hardware component 106.

Firmware 118 for the hardware component 106 can have a plurality of data regions 120. Each data region 120 may be associated with one or more features 116 on the hardware component 106. For example, the data region 120 of a video codec 228 (e.g., the first feature 116a) on the hardware component 106 can be removed, and an audio codec 230 (e.g., the second feature 116b) for the hardware component 106 may be an added the feature 116.

In this manner, the resource management apparatus 108 may monitor, control, and/or modify the technologies and features 116 available on the circuit board 104 even after the construction of the circuit board 104, build, and sale of the computing device 102. For example, the resource management apparatus 108 can change the features 116 of the circuit board 104 in real-time due to customer demand for features 116 one or more computing devices 102. In a more specific example, a user of a computer/cellphone, the circuit board 104 may securely enable a 5G wireless the feature 116 while using the computing device 102.

The resource management apparatus 108 may reduce the manufacturer's exposure to later patent infringement claims. The secure process by which the resource management apparatus 108 enables and disables the feature 116 lends itself to maintaining a log or ledger (e.g., the register store 312 described with reference to FIG. 3) of the enabled features 116 and the licensing fees paid for the enablement of the specific technology. In other words, the master management device 110 can use a ledger to record what features 116 were purchased, when, for how much, and also record the date that any licensing surcharges or service fees were paid. The secure operation of the resource management apparatus 108 operates to modify data regions 120 of firmware 118. Accordingly, the disabled features 116 on the hardware component 106 cannot readily be modified (e.g., enabled) without proper certification and/or authorization.

The resource management apparatus 108 may modify features 116 of the hardware component 106 after the sale and/or shipping of the computing device 102. In one embodiment, a resource management apparatus 108 includes a key installed in the data region 120 of firmware 118, e.g., during assembly of the computing device 102 and/or remotely afterward. The server 114 can then use the key to operate the resource management apparatus 108 and remotely enable/disable features 116 on the computing device 102 by targeting data regions 120 of the firmware 118. In one embodiment, the server 114 may entirely erase the data region 120 and/or firmware 118 and reinstall firmware 116 to enable/disable the feature 116. Alternatively, server 114 may partially erase the data region 120 and/or firmware 118 to enable/disable the feature 116.

The master management device 110 limits the exposure of the chipmaker and/or the assembler to later claims of unauthorized use since the chipmaker and/or assembler can selectively enable or disable the technology and features 116 on the hardware component 106. In other words, the server 114 may use the resource management apparatus 108 to periodically and/or remotely scan data regions 120 of firmware 118 on the connected device to ensure the features 116 are authorized. In the event of an unauthorized use, the master management device 110 can remove the data region 120 for the feature 116.

In response to enabling or disabling the feature 116, the hardware component 106 may indicate a current status of the feature 116. Specifically, the resource management apparatus 108 may update a database and/or use a database on server 114 to calculate royalties. The resource management apparatus 108 may display this information to the end-user and/or a manufacturer's representative. The resource management apparatus 108 may indicate that the feature 116 was enabled/disabled to separate the master management device 110 on the server 114. The master management device 110 on the server 114 may check that the feature 116 was or was not authorized. In addition, the master management device 110 can check to ensure that the feature 116 was successfully added, removed, or disabled. For example, when the resource management apparatus 108 indicates to the master management device 110 that the feature 116 was not successfully removed, the master management device 110 connects to the computing device 102 through the server 114 to remotely disable the feature 116.

The resource management apparatus 108 controls which features 116 are enabled and disabled on the hardware component 106. In certain embodiments, the resource management apparatus 108 may be partially or entirely included on the circuit board 104. Similarly, the resource management apparatus 108 may be partially or entirely installed remotely on the master management device 110. Depending on the enabled technologies of the hardware component 106 and the feature 116 being enabled, the resource management apparatus 108 may obtain a price or surcharge for enabling the requested feature 116 on the computing device 102. The surcharge covers the potential cost of any services and/or licensing fees, etc. Similarly, a refund or discount may be applied for disabling various features 116 on the hardware component 106. In this way, the resource management apparatus 108 enables the device assembler to offer the same computing device 102 at different price points, e.g., by enabling paid features and disabling unpaid features 116. The resource management apparatus 108 enables the assembler to modify the circuit board 104 after the sale of the computing device 102 and/or in real-time at the time of use.

The resource management apparatus 108 may moderate the hardware component 106 of the circuit board 104. For example, the resource management apparatus 108 may regulate one or more computing devices 102 such as a secure hardware dongle or other hardware appliance device, e.g., a set-top box, a network appliance, etc. In various embodiments, the computing device 102 may include a head-mounted display, a laptop computer, a server 114, a tablet computer, a smartphone, a security system, a network router or switch, or the like. The resource management apparatus 108 may connect to the computing device 102 either by a wired connection (e.g., a universal serial bus ("USB") connection) or a wireless connection (e.g., Bluetooth®, Wi-Fi, near-field communication ("NEC"), LTE, 5G, or the like).

A hardware component of the resource management apparatus 108 and/or a hardware component 106 on the circuit board 104 may include a power interface, a wired and/or wireless network interface, a graphical interface that attaches to a display, and/or a semiconductor integrated circuit device as described below, configured to perform the functions described herein. The resource management apparatus 108 cooperates with the master management device 110 to control one or more computing devices 102. The resource management apparatus 108 and the master management device 110 selectively enable and/or disable various features 116 on circuit boards 104 connected to the secure network 112. The resource management apparatus 108 and/or the master management device 110 may create a different product (e.g., the computing device 102) from two physically identical computing devices 102, with each having different features 116 enabled and/or disabled.

The resource management apparatus 108 controls the circuit board 104 of the computing device 102. The circuit board 104 may include a semiconductor integrated circuit device (e.g., one or more chips, die, or other discrete logic hardware) or the like. The circuit board 104 may be a field-programmable gate array ("FPGA") or other programmable logic, firmware for an FPGA or other programmable logic, microcode for execution on a microcontroller. For example, the circuit board 104 may be an application-specific integrated circuit ("ASIC"), a processor, a processor core, or the like.

In various embodiments, the resource management apparatus 108 has a different circuit board 104 than the computing device 102. For example, the resource management apparatus 108 may be located separately and/or externally from the circuit board 104 of the computing device 102. In another embodiment, the resource management apparatus 108 is located on the circuit board 104 of the computing device 102. For example, the resource management apparatus 108 may be mounted on a printed circuit board with one or more electrical lines or connections (e.g., volatile memory, a non-volatile storage medium, a network interface, a peripheral device, a graphical/display interface, or the like).

The hardware component 106 of the circuit board 104 (and/or hardware component of the resource management apparatus 108) may include one or more pins, pads, or other electrical connections configured to send and receive data (e.g., in communication with one or more electrical line of a printed circuit board or the like). One or more hardware circuits and/or other electrical circuits may be configured to perform the various functions of the circuit board 104 for the computing device 102 and/or the resource management apparatus 108. The resource management apparatus 108 may couple to the master management device 110 to remotely enable and/or disable data regions 120 of firmware 118 and turn on/off various features 116 of the circuit board 104.

The semiconductor integrated circuit device of the circuit board 104, for example, on a computing device 102 (or a hardware component of the resource management apparatus 108), in certain embodiments includes and/or is communicatively coupled to one or more volatile memory media, which may include but is not limited to random access memory ("RAM"), dynamic RAM ("DRAM"), cache, or the like.

In one embodiment, the semiconductor integrated circuit, apparatus, the circuit board 104, or another hardware component of the resource management apparatus 108 and/or the computing device 102 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 112 may include a digital communication network 112 that transmits digital communications, for example, between the resource management apparatus 108 on the server 114 and the computing device 102. Secure network 112 may enhance secure communications between the computing device 102 and the master management device 110. The data network 112 may include a wireless network, such as a wireless cellular network, a local wireless network, a Wi-Fi network, a Bluetooth® network, a near-field communication ("NEC") network, an ad hoc network, and/or the like. The data network 112 may include a wide area network ("WAN"), a storage area network ("SAN"), a local area network ("LAN") (e.g., a home network), an optical fiber network, the internet, or another digital communication network. The data network 112 may include two or more networks. The data network 112 may include one or more servers 114, routers, switches, and/or other networking equipment. The data network 112 may also include one or more computer-readable storage media, such as a hard disk drive, an optical drive, non-volatile memory, RAM, or the like.

The wireless connection may be a mobile telephone network. The wireless connection may also employ a Wi-Fi network based on any Institute of Electrical and Electronics Engineers ("IEEE") 802.11 standards. Alternatively, the wireless connection may be a Bluetooth® connection. In addition, the wireless connection may employ a Radio Frequency Identification ("RFD") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Deigns®. Alternatively, the wireless connection may employ an ANT® and/or ANT+® connection as defined by Dynastream® Innovations Inc. of Cochrane, Canada.

The wireless connection of data network 112 may be through an infrared connection, including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of this application's filing date.

One or more servers 114 may be embodied as blade servers, mainframe servers, tower servers, rack servers, etc. The one or more servers 114 may be configured as mail servers, web servers, application servers, FTP servers, media servers, data servers, web servers, file servers, virtual servers, and/or the like. Servers 114 may be communicatively coupled (e.g., networked) over a data network 112 to one or more computing devices 102 and may be configured to execute or run machine learning algorithms, programs, applications, processes, and/or the like.

A computing device 102 can have an extensive supply chain. For example, the supply chain may include chip manufacturers (aka chipmakers), logic board manufacturers, device assemblers, and/or device makers. The manufacturers of the computing device 102 work together to manufacture and distribute the circuit board 104 on a particular computing device 102. Generally, manufacturers and assemblers in the supply chain attempt to obtain any pertinent licenses from the relevant patent holders before introducing a new circuit board 104 and/or computing device 102 to the market.

For example, a hardware component 106 (e.g., a chip on the circuit board 104) may use various industrial standards/technologies that are licensed and protected. Many such features have become industry standards and may use a FRAND fee agreement and/or another agreed-upon licensing arrangement. In practice, a chipmaker manufactures the chipset and sells it to a logic board assembler and/or device assembler that implements the completed circuit board 104 into a viable consumer product (e.g., a computer).

As used herein, "manufacturer" refers to any organization or entity along the supply chain, from the fabrication of a chip or another component to a consumer-ready product. A "chipmaker" is the particular manufacturer of the chipset, and a device assembler assembles the viable consumer product utilizing the circuit board 104 in the computing device 102 that is sold to the end-user as a product (e.g., laptop or cellphone).

Given the various technologies and functions on each hardware component 106 and the different configurations of each circuit board 104, manufacturers often seek to obtain a broad technology license before releasing a new product, e.g., cellphone, computer, or laptop. However, this approach can be costly if certain technologies and/or features are not desirable for the particular circuit board 104. In various embodiments described below, the end-consumer may selectively include/exclude a new technology on the hardware component 106, which the chipmaker and/or device assembler included on the circuit board 104. The end-consumer may decide not to pay for or include the feature 116 in the final product. Alternatively, the chipmaker and/or device assembly may omit a feature 116 on a base model of the circuit board 104 that the end-consumer can later enable.

These features enable chipmakers and device assemblers to create the same or similar physical consumer base models that both include or exclude new technologies. However, the configuration also enhances the consumer's ability to selectively enable and disable features on the hardware component 106 without a new design or the circuit board 104.

The number of technologies for each hardware component 106 may make variations in just one or two features 116 too significant to renegotiate licensing fees, e.g., for "small" feature 116 variations. Including unused technologies on each of the circuit boards 104 may result in a substantial and unnecessary increase in the cost of the computing device 102. Increased costs may be justified since the costs may be small, or the consumer may want to use the additional features 116. However, depending on the use, these features 116 may not substantially contribute to the consumer's use of the hardware component 106 and only increase the cost of the computing device 102. For example, to pay for broad licensing fees for which the technology will not be used or accessed.

In some embodiments, commercial software often uses recurring licensing payments that may include a mechanism (e.g., a dongle or license the server 114) that monitors and/or verifies authorized use. When a consumer (private or commercial) attempts to use the software in an unauthorized process, the software may direct the user to a licensing page of an application 130 where the license can be acquired. In another embodiment, application 130 can be downloaded as a preloaded installer on a system with a stub to download and install a subsequent application. Accordingly, there is a need from the perspective of the device assembler and end-user to selectively enable and/or disable desirable features 116 on the hardware component 106 at the time of use.

The Applicant has found a system for selective inclusion of features 116 on the hardware component 106 that enables the end-user to enable/disable features 116 of the hardware component 106 selectively. The selective inclusion of various technologies (e.g., the feature 116) allows consumers to target the desired technology and/or the feature 116 during the use of the computing device 102 when the functionality justifies the surcharge. Selective feature 116 inclusion/exclusion on the hardware component 106 during use advances marketplace competition and provides a broader assortment of available technologies for the end-consumers of hardware components 106 on the circuit board 104. The consumer selectively enables/disables features in real-time and therefore enjoys a more efficient distribution of new technologies distributed to the base models and users that are willing to pay for the technology. Selective enablement also provides a broader assortment of products available to customers since they can selectively customize which features 116 are efficient for their individual needs and/or practices.

The Applicant has found that this system and method enable the consumer to modify the hardware component 106 at the time of use in a way that enables the manufacturers (e.g., chipmakers and/or device assemblers) to monitor and record the functional use and/or enabled features 116 on the hardware component 106. In this way, the chipmakers and/or device assemblers can obtain an appropriate surcharge to pay the related licenses, any service costs, and/or monitor the use of the enabled feature 116 in real-time.

The Applicant has found that these systems and methods enable the device assemblers to order commercially available standard circuit boards 104 from the chipmaker and build new virtual devices from the same standard base configuration. The device assembler can create new virtual circuit boards 104 based on the model's base configuration, submodel, and/or location (e.g., country) to enable/disable various technology features 116 for that product family. Further, the enablement/disablement method cannot be later modified by the end-consumer. The system and method can also ensure that the enabled features 116 have the proper licenses and may also prevent the distribution of unlicensed technology by either the chipmaker or the device assembler.

An application 130 (or other system software 224) can be modified to run on the computing device 102 and communicate with a server 114. The server 114 has a master management device 110 that manages a resource management apparatus 108 to modify features 116 on various computing devices 102. The resource management apparatus 108 may facilitate communication between the computing device 102 and the master management device 110 on the server 114. Periodic updates maintain a register or log of the enabled features 116 on the hardware component 106 of the computing device 102. The resource management apparatus 108 periodically communicates the enabled features 116 of the computing device 102 to the master management device 110 on the server 114.

When a consumer desires or attempts to add a feature 116 to the hardware component 106, application 130 determines whether the feature 116 is disabled and determines a cost for enabling the requested feature 116. Application 130 may request confirmation from the user and/or may process payment prior to enabling the feature 116. In some embodiments, the payment for enabling the feature 116 is obtaining information from the user. In other embodiments, additional costs may be collected for licensing agreements and/or anticipated services of the enabled feature 116.

When the consumer agrees to the surcharge and/or provides the information to acquire the feature 116, the master management device 110 on the server 114 identifies the computing device 102 seeking to add the feature 116. A public device key uniquely identifies the computing device 102 on a secure data network 112. The master management device 110 uses the device key to look up and/or generate a public key for the computing device 102 and obtain the feature 116 to be enabled for the computing device 102. Upon validating the public key, verification of the feature 116 to be enabled, and proper credentials and/or payment, the master management device 110 generates an encrypted code to the computing device 102. The encrypted code operates as a private key for the computing device 102 to download firmware 118 to a data region 120 and enable the feature 116. When the computing device 102 sends the public key and the private key to server 11 and enables the desired feature 116 on the computing device 102, the master management device 110 updates the ledger and ensures that the appropriate licensing fees are paid. In various embodiments, the encrypted code includes firmware 222 and a public key accessible to the computing device 102 on the data network 112.

In various embodiments, the master management device 110 can adjust the features 116 enabled on one or more computing devices 102. For example, the master management device 110 may determine the location of the computing device 102 and determine that the technology is not available to the computing device 102 based on the determined location. In one embodiment, the server 114 may use the information provided by the customer and/or GPS data to determine the location of the computing device 102. Once the location of the computing device 102 is determined, the master management device 110 determines whether to enable the feature 116 and obtains the information and cost to enable the feature 116.

The master management device 110 can also use virtual fuses 122 to enable/disable features 116 of the computing device 102. In various embodiments, virtual fuse 122 may permanently enable/disable a feature 116. For example, in multiple models, sub-models, and/or countries where different technologies are required, the virtual fuse 122 may be adjusted during the first time of use and permanently set the feature 116. When the virtual fuse 122 is "on," the hardware component 106 technology is enabled, and the feature 116 is available technology for that the computing device 102. If, in contrast, the virtual fuse 122 is "off," then the technology remains disabled and cannot be enabled by the end-user. For example, the firmware for that technology is "bricked" when the virtual fuse 122 is permanently disabled.

In other embodiments, virtual fuse 122 operates to enable and/or disable various features 116 that can later be enabled and/or disabled on demand. In this embodiment, the user is free to modify the digital architecture of the hardware component 106 in real time (e.g., on demand), provided the user provides the information and processes the appropriate payment. The Applicant has found that maintaining a master management device 110 located remotely from the hardware component 106 facilitates the selective enablement/disablement of features 116 that modify the hardware component 106 after the sale of the computing device 102. For example, the master management device 110 may include enabling/disabling firmware 118 codes. Similarly, the master management device 110 may include an external fuse block 124 located off the hardware component 106 and configured to write-one/one-time programmable storage on the hardware component 106. In this way, features 116 can be set and adjusted on client demand at the time of use. In various embodiments, enabling/disabling features may be irreversible or temporary in nature.

During the manufacturing process, a manufacturer can establish enabling and/or disabling bit values for the hardware component 106 in a software-driven process. The resource management apparatus 108 can use the bit values to enable/disable data regions 120 to operate the digital virtual fuse 122 and modify features 116 for the computing device 102. The master management device 110 on the server 114 configures the particular hardware component 106 and selectively enables/disables the features 116 on the computing device 102 in real-time. The master management device 110 can send an enabling bit and/or code to data region 120 of the firmware 118 of the hardware component 106 on the circuit board 104 to selectively enable or disable various features 116.

The ability of the end-user to pay only for utilized features 116 enables greater flexibility for purchasing technologies of the hardware component 106. In addition, since the resource management apparatus 108 can be stored externally from the hardware component 106, the manufacturer's overall complexity may be simplified to keeping a log of the enabled features on the computing device 102.

In another variation, an embedded firmware 118 on the hardware component 106 can include a special and/or unique program to create a permanent virtual switch and/or a temporary virtual fuse 122. The virtual fuse 122 is established within a data region 120 of the firmware 118 that either enables or disables the technology. Virtual fuse 122 may access a memory storage device 126 and/or directly modify data regions 120 of firmware 118.

The data region 120 can be charged to selectively enable/disable the firmware 118 and/or brick the hardware component 106 so that the processor cannot access it. In the latter case, the disabled feature 116 may be permanently removed from the computing device 102. The virtual fuse 122 may operate in a permanent, irreversible fashion or a temporary, reversible fashion. The virtual fuse 122 may operate software that controls a data region 120 of firmware 118 to enable a feature 116 in a reversible process.

In this way, the feature 116 can be enabled/disabled at any time. At system boot and/or reset, the embedded firmware 118 on either the hardware component 106 or the circuit board 104 can read the virtual fuse 122 stored in the data region 120 and obtain the enabled features of the hardware component 106. When the virtual fuse is on, the feature 116 is enabled. In contrast, when the virtual fuse is off, the feature 116 is disabled for the hardware component 106. Similarly, system software, drivers, and/or other components may periodically read the virtual fuse 122 settings and determine the enabled features 116.

FIG. 2 is a schematic block diagram of an apparatus 200 comprising various hardware components 202. The apparatus 200 has hardware components 202 that may be the same or similar as circuit board 104 having hardware components 106. In various embodiments, hardware components 202 of the apparatus 200 can include processors 204 (e.g., a central processing unit or CPU 206, a processor 204 or processor core, a field-programmable gate array ("FPGA") or other programmable logic, an application-specific integrated circuit ("ASIC"), a controller, a microcontroller, and/or another semiconductor integrated circuit device). The apparatus 200 includes a CPU 206 and various processors 204. Processor 204 includes a CPU 206 but may include additional processing cores or processors 204 on the apparatus 200 other than CPU 206. Stated differently, CPU 206 is a specialized processor 204, but other processors 204 may be included on the apparatus 200.

The apparatus 200 can also include a memory storage device 208 that includes volatile memory or RAM 212 and/or a non-volatile storage medium, e.g., ROM 214. In various embodiments, memory storage device 208 may include an (erasable) electronic read-only memory, such as an EPROM or EEPROM device 216 and/or a flash memory device 218. The memory storage device 208 may also include addresses 210, e.g., for data regions 220 of firmware 222, system software 224 (e.g., an operating system), and/or other programs that are run by processor 204.

A virtual fuse 256 may erase all or part of a memory storage device 208, such as an EPROM or EEPROM device 216 and/or flash memory device 218. Virtual fuse 256 may reprogram the memory device 208 (e.g., the EEPROM device 216 and/or the flash memory device 218) to enable the data region 220 associated with the feature 260 to be enabled on the apparatus 200. Virtual fuse 256 may use standard PC voltages to erase and/or reprogram the data region 220 of the memory device 208 (e.g., the EEPROM device 216 or the flash memory device 218) associated with the feature 260 to be removed, replaced, and/or enabled on the apparatus 200.

Additional hardware components 202 of the apparatus 200 may include a graphics card or GPU 226 having a video codec 228 and/or an audio codec 230, an RF Transceiver 232, a camera image signal processor 234, a Near Field Communications (NFC) wireless subsystem 236 including a Bluetooth subsystem 238 and a Wi-Fi subsystem 240, a digital signal processor or DSP 242, an artificial intelligence neural network or AI engine 244, a modem 246, such as a cellular modem 248, and/or connections to USB ports 250 and the like.

For example, the apparatus 200 can have a charging port 252, a security support system 254, and/or cellular technology (e.g., a cellular modem). As used herein, various components are shown on a single member (e.g., video codec 228 and audio codec 230 on GPU 226) can be separated onto one or more hardware components 202. FIG. 2 shows one exemplary embodiment of several hardware components 202 on the apparatus 200, but it should be recognized that other hardware components 202 and/or configurations of the apparatus 200 are within the scope of the present disclosure.

Each hardware component 202 includes firmware 222 configured to enable the hardware component 202 to communicate with processors 204, the CPU 206, and/or the apparatus 200 system software 224 stored on a non-volatile memory storage device 208. The CPU 206 utilizes system software 224 that communicates with and/or enables various technologies or features 260 of each hardware component 202. For example, video codec 228 on GPU 226 is enabled and enhanced by the firmware 222 interaction with the CPU 206 through the system software 224.

The system software 224 may be run by the CPU 206 and/or other processors 204 to communicate and/or control various features 260 of the connected hardware components 202. The system software 224 may be a processor-side application 262 that facilitates and/or enables the communication between the CPU 206 and various hardware components 202. As used herein, the firmware 222 is a client-side code located on the hardware component 202, and that enables the hardware component 202 to communicate with the CPU 206 and/or the apparatus 200. In other words, the system software 224 includes the firmware 222 for a unique individual hardware component 202, and the firmware 222 is installed on the hardware component 202 to enable the feature 260 of the hardware component to be operated by the CPU 206 and/or other processors 204.

Hardware component 202 includes one or more data regions 220 in the firmware 222 to selectively enable or disable features 260 of the hardware component 202. The data regions 220 each have a unique address 210 to selectively enable the granularity of features 260 to be enabled or disabled on the apparatus 200. The apparatus 200 functionality is a compilation of the variation and quantity of features 260 enabled by the hardware components 202 and the ability to control the hardware component 202 through the system software 224.

For example, a video codec 228 of a GPU 226 enhances the apparatus 200 by providing a standardized format for communicating with the system software 224. When properly configured with the appropriate firmware 222, GPU 226 improves the apparatus 200 with the various features 260 provided by the video codec 228 to compress/decompress, communicate, transmit, and/or display video signals. However, each of these features 260, is only available to the apparatus 200 if the data region 220 is enabled and the appropriate firmware 222 is installed and readable by the system software 224 for the specific video codec 228 and/or GPU 226 feature.

Similarly, NFC wireless subsystems 236 use a standardized and appropriate firmware 222 to enable various features 260 for a Bluetooth subsystem 238 and/or Wi-Fi subsystem 240. In one embodiment, the enabled data region 220 of the firmware 222 may enable the apparatus 200 to have 5G cellular capability feature 260, whereas the same the apparatus 200 without this firmware 222 (e.g., in data region 220) would only have access to a 4G spectrum. Similarly, the Wi-Fi subsystem 240 may include another data region 220 and/or different firmware 222 for a Wi-Fi 6-ready feature 260 compared to 802.11a/b/g 802.11n Wi-Fi features 260.

Since the firmware 222 is a trusted system component, the master management device 110 can track the data region 220 (e.g., in a register module 304) to ensure proper licensing payments are paid and to validate payments to contest infringement claims. The master management device 110 can later verify and attest that the configuration was licensed, secured, and unmodified. Further, the firmware lifecycle is enhanced by including this self-modifying data region 220 and modifying it with a virtual fuse 256 that selectively enables, disables, or removes the firmware 222 for one or more features 260 in data region 220.

One feature of this application is a manufacturer's ability to enable and/or disable various features 260 of the apparatus 200 following the sale of the computing device 102. For example, the resource management apparatus 108 may utilize the master management device 110 to modify a digital architecture 264 of the apparatus 200 without changing the physical architecture 266 of the apparatus 200. For example, the same apparatus 200 can include a cellular modem 248 that supports both 4G and 5G features 260 but have only 4G features enabled. This may make the cellphone more affordable by not necessitating a new apparatus 200 design and/or reducing the cellphone device's licensing fees.

The enablement of different features 260 on the apparatus 200 may include costs and surcharges, such as design and testing costs and/or licensing fees for the various enabled technologies. This can increase the total cost of the apparatus 200 and/or the computing device 102. The user may opt to pay a reduced price for a similar computing device 102 with certain features 260 disabled.

Previously, manufacturers could not selectively enable and/or disable individual features 260 on the apparatus 200 after being sold to the user. This situation forced consumers to pay for a license for all the enabled features 260, often including for several disabled or underutilized features 260. The Applicant has found that the ability to disable various technologies and/or features 260 selectively and/or permanently on an apparatus 200 provides the manufacturer the benefit of mass production of the same designed apparatus 200 and provides the end-consumer the selective variability for desired features 260. In other words, the costs of design and manufacturing different virtual SKU products is more efficient than physically changing the structures on the apparatus 200. Also, the consumer has greater access to the desirable features 260 for a particular application without paying for undesired technologies.

Figure 3:
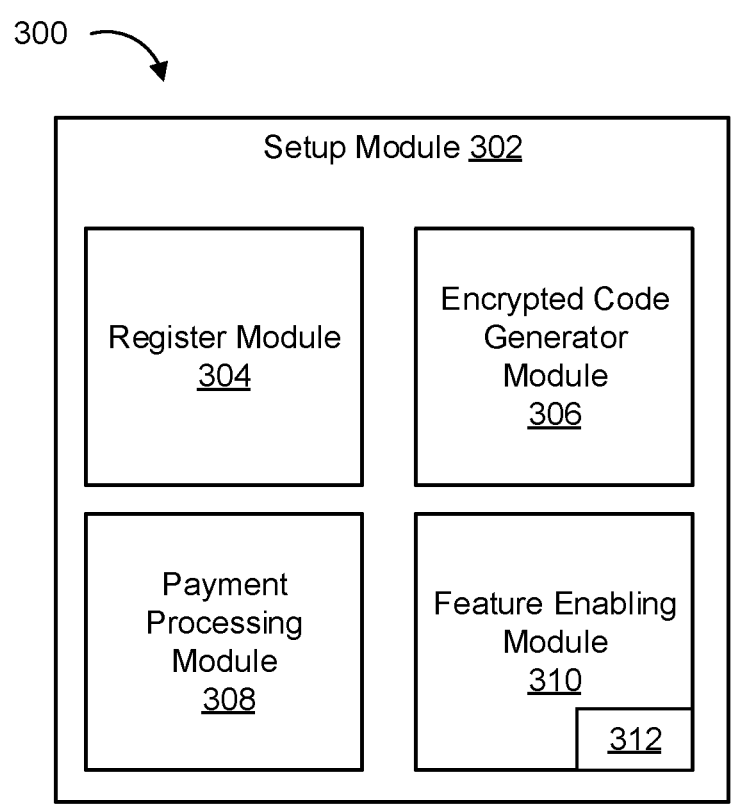
FIG. 3 is a schematic block diagram illustrating one embodiment of an apparatus for modifying the enabled features of a hardware component at the time of use.

FIG. 3 is a schematic block diagram illustrating one embodiment of another apparatus or application 300 for modifying the enabled features 260 of a hardware component 202 on an apparatus 200 at the time of use. The apparatus 300 has a setup module 302 that may include code executable on processor 204 to enable/disable data regions 220 of firmware 222 on various hardware components 202. Setup module 302 includes a register module 304, encrypted code generator module 306, a payment processing module 308, and a feature enabling module 310. In various embodiments, setup module 302 may generate and/or keep a register store 312 of the enabled feature 260 on the apparatus 200.

A user may access setup module 302 to enable or disable features 260 on the apparatus 200. The setup module 302 may ask the user questions, request verification/security information, and/or obtain information regarding licensing fees to calculate and receive a payment to enable one or more features 260. In some embodiments, setup module 302 will scan the current configuration of the apparatus 200 and determine if the feature 260 will work with the current configuration. Setup module 302 may make recommendations and/or warn the user if the feature 260 would not be enabled under the current configuration.

Register module 304 obtains the feature 260 of the hardware component 202 on the apparatus 200 to be changed, and that is not currently enabled or disabled. The register module 304 and the feature enabling module 310 cooperate to maintain a register store 312 of the features 260 on each hardware component 202 enabled on the apparatus 200. The register module 304 verifies that the feature 260 is not enabled and verifies that the feature 260 is available. For example, the register module 304 may determine, based on the location of the apparatus 200, whether to enable the feature 260. The register module 304 may determine a cost for licensing the feature 260 or determine if any additional support for the enabled feature 260 might be used.

An encrypted code generator module 306 establishes a secure connection between the computing device 102 and the server 114. The encrypted code generator module 306 may use a public key within a network 112 to identify the computing device 102 and securely connect the resource management apparatus 108 to the requesting computing device 102. For example, only computing devices 102 with a public key can obtain an encrypted code or private key from the server 114 that enables the feature 260 of the apparatus 200. A public key and a private key may be sent to the computing device 102 to securely receive user or device information and/or process a payment. Encrypted code generator module 306 also creates the encrypted code to record the enabled feature 260 in register store 312.

Upon receipt of the private key, the payment processing module 308 determines a cost for enabling the desired feature 260 and associates the encrypted code and/or private key with the payment for the feature 260 to be enabled. In some embodiments, the payment may be zero. For example, the payment processing module 308 may determine that based on the information provided by the user, the feature 260 may be enabled without further payment. In one embodiment, the payment may be negative, such that the user is reimbursed for disabling a feature 260.

Upon validation and receipt of the payment, the payment processing module 308 sends an electronic signal (e.g., encrypted code) to the feature enabling module 310 that enables the feature 260 on hardware component 202 associated with the electronic signal and/or encrypted code. The feature enabling module 310 may update register store 312 of the successful completion of enabling the requested feature 260. In one embodiment, a feature enabling module 310 may update the register store 312 of an unsuccessful completion or attempt to enable the requested feature 260.

Figure 4:
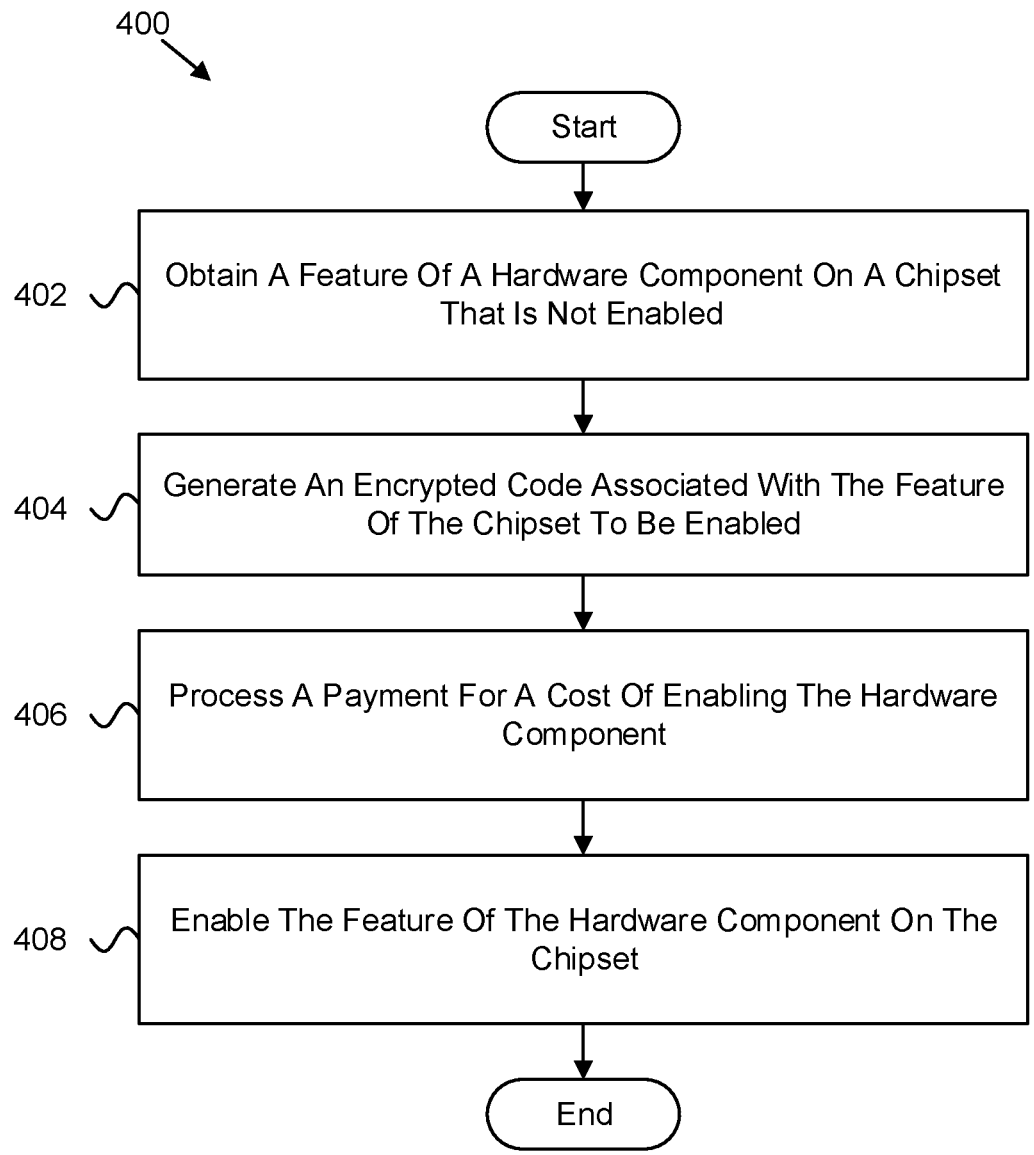
FIG. 4 is a schematic flow chart diagram illustrating one embodiment of a method for managing enabled technologies on a hardware component at the time of use.

FIG. 4 is a schematic flow chart diagram illustrating one embodiment of a method 400 for modifying the features 260 of an apparatus 200 at the time of use. Method 400 includes obtaining 402 a feature 260 of a hardware component 202 on the apparatus 200 that is not currently enabled. A user may directly request the feature 260 be enabled or may request that functionality for the feature 260 be enabled, and the processor 204 indicates that the feature 260 is currently disabled. Processor 204 may notify the user of the disabled feature 260 and/or request user information and/or a confirmation from the user before obtaining 402 the feature 260 and/or the cost of enabling the feature 260.

In one embodiment, method 400 includes generating 404, an encrypted code associated with the feature 260 of the apparatus 200 to be enabled. The computing device 102 may securely communicate the public key to the server 114. The server 114 may generate a private key and an encrypted code of enabling the feature 260. Alternatively, a resource management apparatus 108 may be located locally and communicate to the master management device 110 through a secure network 112 to a server 114 that determines an encrypted code and/or private key for the requested feature 260 to be enabled. In another embodiment, the resource management apparatus 108 may be located on both the computing device 102 and the master management device 110.

Method 400 includes processing a payment 406 for the cost of the enabled feature 260. For example, processing the payment 406 may include determining the specific technology being requested and/or enabled, determining a royalty and/or a license agreement for the subject technology, determining whether the technology is subject to a standardized licensing payment option (e.g., a FRAND licensing system), and/or requesting payment from the user.

Upon receipt and validation of the payment, method 400 further includes enabling 408 the feature 260 associated with the encrypted code and/or private key to enable the hardware component 202 on the apparatus 200. In various embodiments, the feature 260 may be enabled in response to the association of the payment processed with the encrypted code for the feature 260 of the hardware component 202. Method 400 may optionally recommend and/or enable other related features 260 based on the processed payment.

Figure 5:
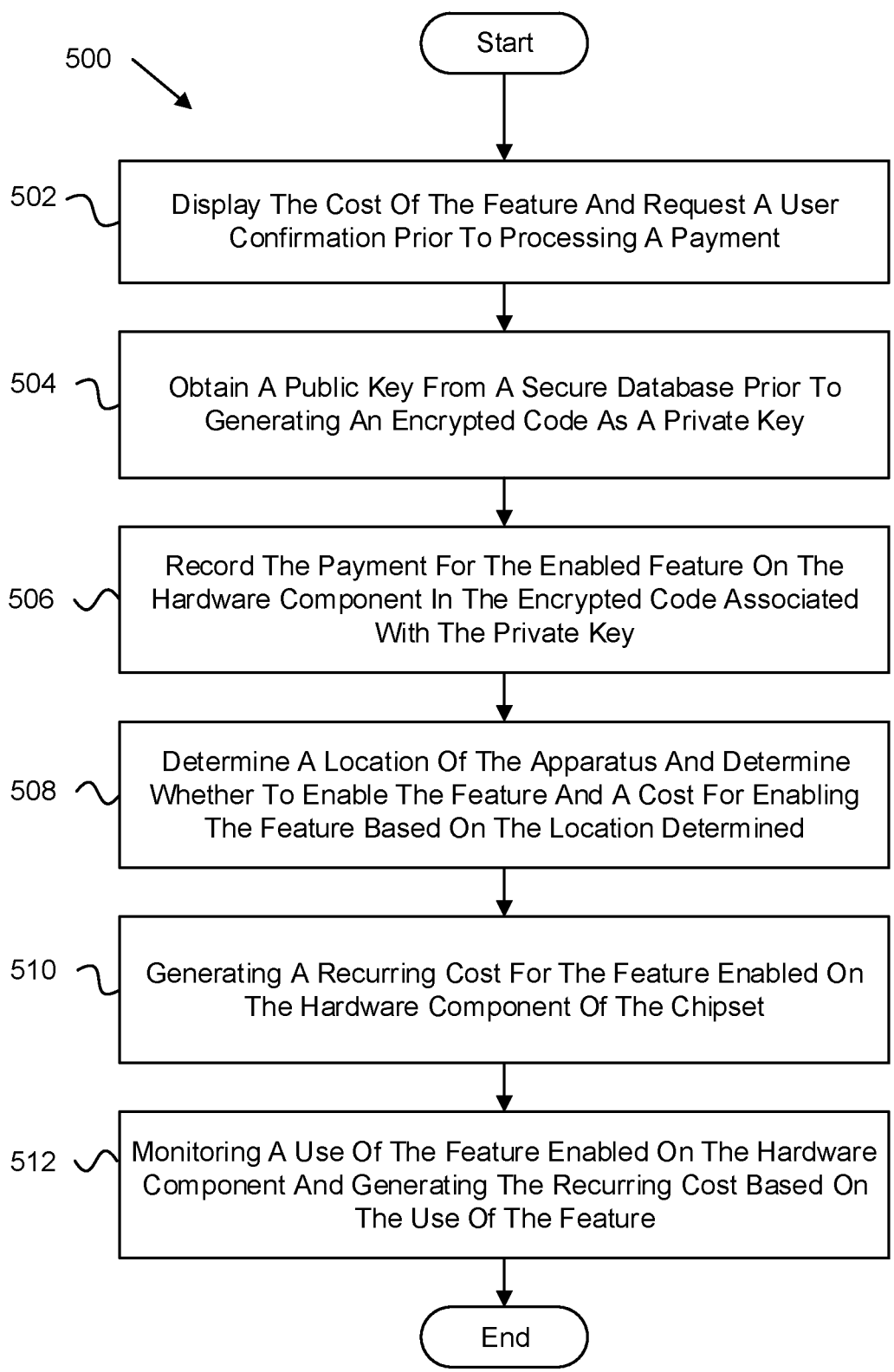
FIG. 5 is a schematic flow chart diagram illustrating optional methods for the method shown in FIG. 4 to selectively manage technology features on a hardware component at the time of use.

FIG. 5 shows other various optional methods 500 for the method 400 shown in FIG. 4. FIG. 5 is a schematic flow chart diagram illustrating various alternative embodiments of the method illustrated in FIG. 4.

In one embodiment, the optional method 500 may display 502 a cost of the feature 260 to be enabled, request additional user information, and/or request user confirmation prior to processing payment. For example, display 502 may request additional user information and request payment prior to enabling a feature 260. Method 500 may include displaying 502 the cost of the feature 260 being enabled and requesting a user confirmation before payment processing.

Method 500 may obtain 504 an encrypted public key, e.g., transmitted from a computing device 102 to a server 114 or other the resource management apparatus 108. The public key may be a sufficient input for the master management device 110 to generate a secure private key. For example, only computing devices 102 with the public key may receive the private key for enabling/disabling, or modifying features 260 on the apparatus 200. Encrypted code and/or private keys are generated in response to the public key of the apparatus 200. The master management device 110 may record 506 the payment for the enabled feature 260 and/or the feature 260 enabled on a hardware component 202 of the apparatus 200 associated with the encrypted code and/or private key. In this way, the master management device 110 may record and/or store the enabled/disabled features 260 on a hardware component of the apparatus 200.

Method 500 may further determine a location 508 of the apparatus 200 and/or the computing device 102. Method 500 may use the determined location 508 to determine whether to enable the requested feature 260 and/or a cost associated with enabling the feature 260, e.g., based on the determined location 508. In one embodiment, method 500 utilizes the location of the computing device 102 to determine 508 (*a*) whether to enable the feature 260 under the regulatory requirements of the locale and/or (b) based on the cost of licensing the technology in this area determines an appropriate surcharge for enabling the feature 260. For example, the computing device 102 may include a GPS unit and/or have date/time-zone configurations or settings that generate a cost of enabling the requested feature 260. In one embodiment, method 500 may directly request the user's location prior to processing the payment, either because the server 114 does not have the location data or to ensure that the location-generated data is accurate.

Method 500 may generate a recurring cost 510 for the feature 260 enabled on hardware component 202 of the apparatus 200, the cost of enabling the technology may be a subscription or recurring cost. For example, the user may be asked to pay a fixed amount weekly, bi-weekly, monthly, bi-monthly, bi-annually, annually, or some other duration. System software 224, such as an application 130, may generate a recurring cost that enables the technology for a fixed period or may amortize the fixed cost of permanently enabling the technology over a fixed duration. In one embodiment, the method further involves monitoring 512 the user's use of the feature 260 enabled on the hardware component 202. Over time, the recurring cost of feature 260 may increase, decrease, or remain the same based on the historical use of the enabled feature 260. In other words, method 500 may further involve monitoring 512 the use of the feature 260 to assess an accurate payment or recurring cost for the enabled technology or the feature 260.

Figure 6:
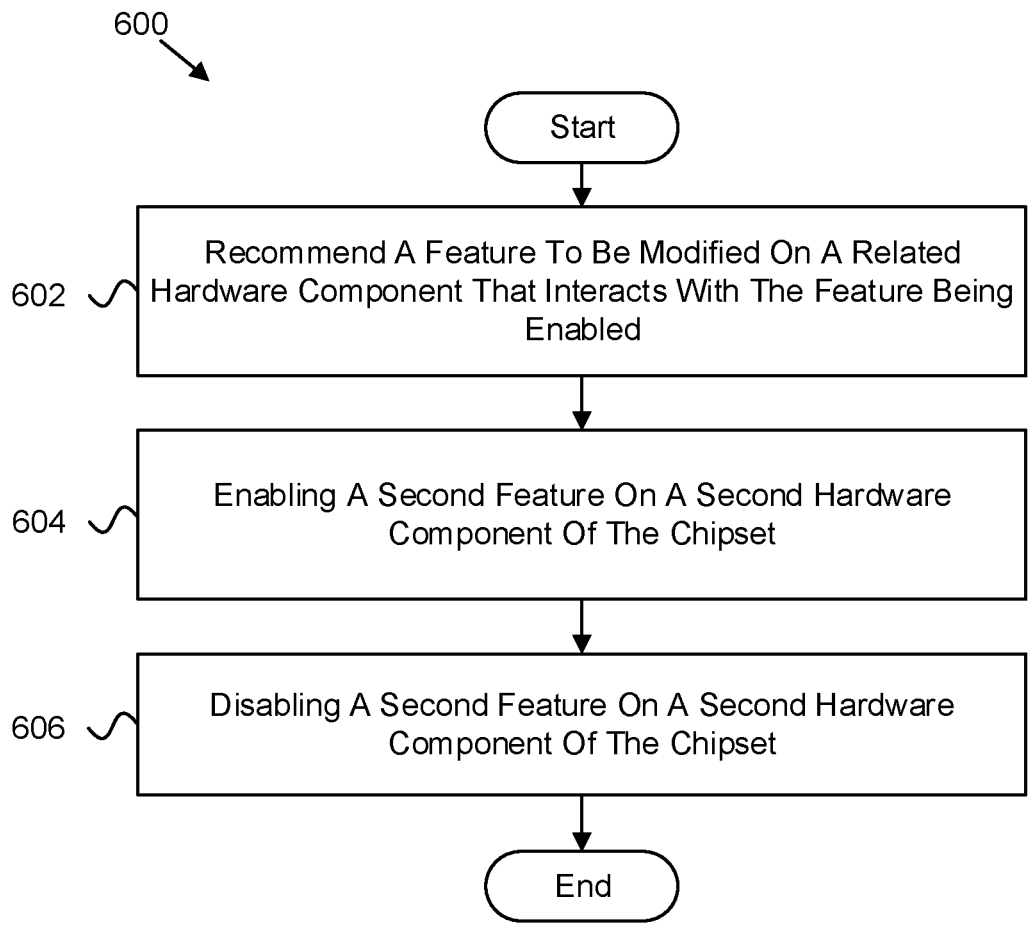
FIG. 6 is a schematic flow chart diagram illustrating optional methods for the method shown in FIG. 4 to selectively manage technology features on a hardware component during the use of the hardware component.

FIG. 6 shows other various optional methods 600 for the method 400 shown in FIG. 4. Specifically, FIG. 6 shows a method of enabling 602 the system to review the requested feature 260 by the user and either includes additional features 260 to ensure the feature 260 requested is properly enabled and/or inform the user of the other technologies needed from the apparatus 200 to enable the desired feature 260. In one embodiment, method 600 may remove a feature 260 from the computing device 102 to add the requested feature 260. For example, method 600 may remove a redundant feature 260, such as when a user requests a new technology that obviates the earlier technology currently on the computing device 102. In another embodiment, the method recommends a feature based on the desired enabled/disabled feature 260. For example, if the user decides to remove access to the feature 260, the system may recommend enabling a cheaper video codec for the apparatus 200. Similarly, if the user upgrades the feature 260 of a video card to enhance a gaming environment, method 600 may recommend updating the audio codec to a certain standard or level.

In various embodiments, method 600 may further enable first and second 604 features 260, or enable one and disable 606 another feature 260 to reduce the cost to the user for unused technology on the apparatus 200 and/or to enable the total utility of the apparatus 200 based on the user's preferences and requests to enable and/or disable specific technology features 260.

Embodiments may be practiced in other specific forms. The described embodiments are to be considered in all respects only as illustrative and not restrictive. Therefore, the scope of the invention is indicated by the appended claims rather than by the foregoing description. All changes which come within the meaning and range of equivalency of the claims are to be embraced within their scope.

What is claimed is:

1. An apparatus, comprising:
a processor; and
a non-transitory memory storage device that contains code when executed by the processor causes the processor to perform the steps of:
receiving a request for a feature of a hardware component that is not enabled;
sending the request to a server device across a data network;
receiving a command from the server device responsive to sending the request;
executing the received command;
operating a virtual fuse stored in a data region of firmware of the memory storage device;
operating software that controls the data region of firmware; and
enabling the feature of the hardware component.

2. The apparatus of claim 1, wherein the code when executed by the processor further causes the processor to perform the steps of:
generating an encrypted code associated with the feature of the hardware component to be enabled;
processing a payment for a cost of enabling the hardware component and displaying the cost for the feature and requests a user confirmation before processing a payment.

3. The apparatus of claim 2, further comprising a secure database comprising a public key, and wherein the secure database obtains the public key prior to generating the encrypted code as a private key and recording the payment for the feature enabled on the hardware component in the encrypted code associated with the private key.

4. The apparatus of claim 2, wherein the cost comprises a licensing fee for a technology enabled on the hardware component.

5. The apparatus of claim 2, wherein the code when executed by the processor further causes the processor to perform the step of:
determining a location of the apparatus and determines whether to enable the feature and the cost for enabling the feature based on the location determined for the apparatus.

6. The apparatus of claim 1, wherein the code when executed by the processor further causes the processor to perform the step of:
recommending a second feature to be modified on a related hardware component that interacts with the enabled feature.

7. The apparatus of claim 1, wherein the code when executed by the processor further causes the processor to perform the step of:
enabling a second feature on a second hardware component to enable the feature in response to the encrypted code for the hardware component.

8. The apparatus of claim 1, wherein the code when executed by the processor further causes the processor to perform the step of:
disabling a second feature on a second hardware component.

9. The apparatus of claim 1, wherein the code when executed by the processor further causes the processor to perform the step of:
generating a recurring cost for the feature enabled on the hardware component.

10. The apparatus of claim 9, wherein the code when executed by the processor further causes the processor to perform the step of:
monitoring a use of the feature enabled on the hardware component and generates the recurring cost based on the use of the feature.

11. A method, comprising:
receiving a request for a feature of a hardware component that is not enabled;
sending the request to a server device across a data network;
receiving a command from the server device responsive to sending the request;
executing the received command;
operating a virtual fuse stored in a data region of firmware of the memory storage device;
operating software that controls the data region of firmware; and
enabling the feature of the hardware component.

12. The method of claim 11, further comprising:
generating an encrypted code associated with the feature of the hardware component to be enabled;
processing a payment for a cost for enabling the hardware component associated with the feature; and
displaying the cost for the feature and requesting a user confirmation prior to processing the payment for enabling the hardware component.

13. The method of claim 12, further comprising a secure database comprising a public key, and wherein the method further comprising obtaining the public key prior to generating the encrypted code as a private key and recording the payment for the feature enabled on the hardware component in the encrypted code associated with the private key.

14. The method of claim 12, wherein the cost for enabling the hardware component associated with the feature further comprises a licensing fee for a technology enabled on the hardware component.

15. The method of claim 12, further comprising determining a location and determining whether to enable the feature and the cost associated with enabling the feature of the hardware component based on the location determined.

16. The method of claim 11, further comprising recommending a second feature to be modified on a related hardware component that interacts with the feature being enabled.

17. The method of claim 11, further comprising enabling a second feature on a second hardware component to enable the feature in response to the encrypted code for the hardware component.

18. The method of claim 11 further comprises disabling a second feature on a second hardware component.

19. The method of claim 11, further comprising monitoring a use of the feature enabled on the hardware component and generating a recurring cost for the feature enabled on the hardware component based on the use of the feature.

20. A computer program product, comprising a non-transitory computer-readable storage medium having program instructions embodied therewith, the program instructions being executable by when executed by a processor causes the processor to perform the steps of:

receiving a request for a feature of a hardware component that is not enabled;

sending the request to a server device across a data network;

receiving a command from the server device responsive to sending the request;

executing the received command;

operating a virtual fuse stored in a data region of firmware of the memory storage device;

operating software that controls the data region of firmware; and enabling the feature of the hardware component.

* * * * *